United States Patent [19]

Krugmann

[11] 4,121,993
[45] Oct. 24, 1978

[54] PROCESS FOR TREATING SEWAGE, PARTICULARLY ON SHIPS

[76] Inventor: Hans G. Krugmann, Moosrosenweg 17, D-2000 Hamburg 71, Fed. Rep. of Germany

[21] Appl. No.: 724,452

[22] Filed: Sep. 17, 1976

[30] Foreign Application Priority Data

Sep. 29, 1975 [DE] Fed. Rep. of Germany ....... 2543353
Apr. 24, 1976 [DE] Fed. Rep. of Germany ....... 2617996

[51] Int. Cl.² .............................................. C02C 5/12
[52] U.S. Cl. .................................. 204/275; 204/149; 204/152
[58] Field of Search ............... 204/149, 255, 257, 253, 204/269, 275, 286; 210/13, 14

[56] References Cited

U.S. PATENT DOCUMENTS

| | | | |
|---|---|---|---|
| 1,131,067 | 3/1915 | Landreth | 204/149 |
| 1,222,637 | 4/1917 | Landreth | 204/149 X |
| 3,340,175 | 9/1967 | Mehl | 204/149 X |
| 3,939,499 | 2/1976 | Roberts | 204/149 X |
| 3,943,044 | 3/1976 | Fenn, et al. | 204/149 |
| 3,962,069 | 6/1976 | Inoue et al. | 204/149 X |

Primary Examiner—Arthur C. Prescott
Attorney, Agent, or Firm—Toren, McGeady and Stanger

[57] ABSTRACT

An apparatus is disclosed for the treatment of sewage on board ships comprising a detritus chamber, a metering and comminuting pump, a chemical container, a preliminary sedimentation tank, an electroreactor vessel and a final sedimentation tank and sludge container attached in configuration and in parallel in the form of a compact unit in a common supporting frame.

5 Claims, 2 Drawing Figures

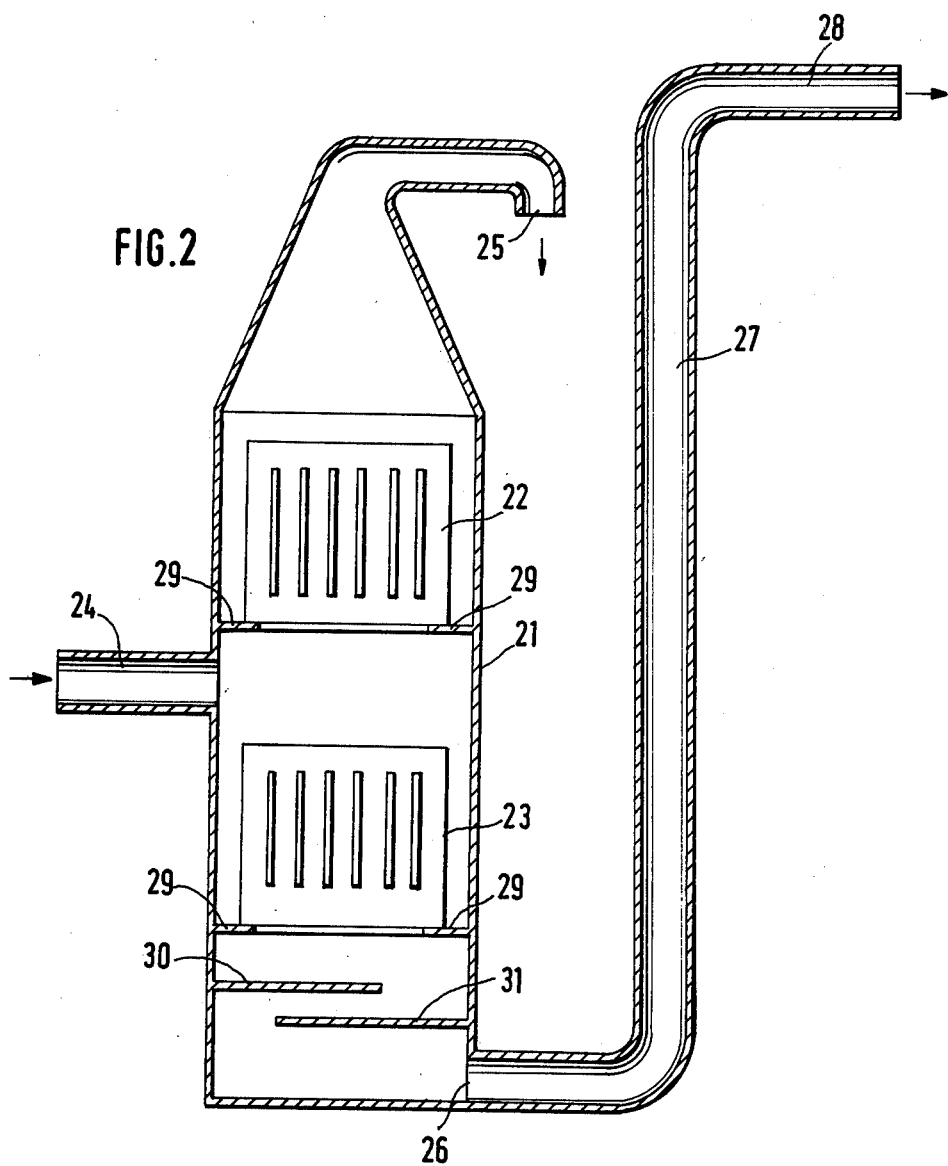

PROCESS FOR TREATING SEWAGE, PARTICULARLY ON SHIPS

The invention relates to a process for treating sewage on ships which contains organic and/or inorganic impurities in the form of coarse or fine particles as a suspension, dispersion or emulsion.

The problem of the invention is to provide a novel process, particularly suitable in connection with the conditions which occur on board ships, facilitating or making possible to rapidly continuously or intermittently separate the impurities contained in the sewage from the water in an apparatus of limited dimensions so that the impurities can be removed permitting the water to be discharged outside the ship in a sufficiently pure form to prevent any harmful pollution of the surrounding waters.

According to the invention, this problem is solved in that the sewage containing the impurities undergoes electrolysis as a result of which the impurities assume a specific gravity differing from that of the water, leading to a spontaneous separation of the solids from the water through sinking or floating, following which the impurities are removed and eliminated alone and the clarified sewage can be discharged outside the ship.

Hereinafter two embodiments of the novel process are described in detail. The first embodiment relates to the treatment of general sewage on board ships, whereby said sewage can contain the most varied organic and/or inorganic waste matter and other impurities. A second embodiment of the novel process relates specfically to the final cleaning of sewage containing oil residues. Finally, apparatuses for performing the first and second embodiments of the novel process are described.

Due to the special operating conditions which apply aboard ships, it is not possible to directly use the known highly effective processes for the biochemical purification and disinfection of sewage. The bacterial cultures necessary for the known processes are very sensitive and could, for example, die off, e.g. during a trial voyage or when the ship is in dock for a relatively long time. A large amount of time is then necessary for the cultures to form again.

On board ships it is important to have a process for the treatment of sewage which, without being dependent on bacterial cultures which both brings about an effective oxidation of the organic substances present in the sewage and the killing off of disease germs, whilst being immediately ready for use at all times.

According to the invention, such a process comprises the sewage collected in a detritus chamber being homogenised intermittently in batches of equal size or optionally continually, initially accompanied by the addition of flocculating agents, by comminuting its solid constituents. It is then fed to a preliminary sedimentation tank in which are deposited the substances which can settle, whilst the fats and greases float to the surface. The thus preliminarily cleaned sewage undergoes electrolysis in an electroreactor vessel, whereby the oxygen given off by the electrolysis brings about a direct and immediate oxidation of the organic substances present in the sewage, whilst the hydrogen given off immediately and directly forms an acid with the inorganic substances present in the sewage such as e.g. sulphur or chlorine compounds which kills off all types of germs. The solid constituents still present in the electrochemically treated sewage are then allowed to settle in a final sedimentation tank. The sludge removed from the preliminary sedimentation tank, the electroreactor vessel and the final sedimentation tank is collected in a sludge tank and is then removed, whilst the clarified sewage is discharged outside the ship from the final sedimentation tank.

This process leads to a constant high purification capacity, even under the varying load conditions existing on board ship. Unlike the biochemical process, the efficiency of the chemical-physical process is not dependent on periods of initial adaptation to different charges, temperatures and water compositions. The chemical-physical process ensures a high operational reliability and a constant high discharge quality. The electrolysis leads to a substantial sterilisation of the sewage without it being necessary to treat it with additional chlorine.

In the electroreactor, electrolysis breaks the water down into its elementary chemical constituents, whereby hydrogen and oxygen are formed as gases. The organic pollutants contained in the water and the germs in the sewage are decomposed and destroyed in a surprisingly short time by the chemical reactions which often take place in very violent manner. This is obviously due to the fact that at the time of electrolytic dissociation, oxgyen occurs in atomic form and in this form has a particularly powerful oxidising effect on the organic pollutants, whereas normally oxygen dissolved in water is present in molecular form as $O_2$ and requires enzymes from vegetable and animal organisms for oxidising organic substances. The hydrogen liberated by the electrolysis forms sulphurous and hypochlorous acids with the inorganic constituents of the sewage which kill off the germs.

During electrolysis iron dissolves as $FE^{3+}$ from the iron electrodes. These iron ions combine with the phosphate $PO_4$ present in the sewage to form difficultly soluble iron phosphate which is then deposited in the final sedimentation tank. This is a particularly desirable secondary effect because as a nutrient salt, phosphate is one of the most important causes of secondary pollution of water. In addition, in water the iron ions have a weight-increasing and flocculating action. Due to their positive charge they attract the negatively charged pollutants of the sewage leading to a very rapid deposition process in the final sedimentation tank so that the residence time in the latter can be kept particularly short.

FIG. 2 shows an apparatus for separating impurities in accordance with the invention.

Figure 1:
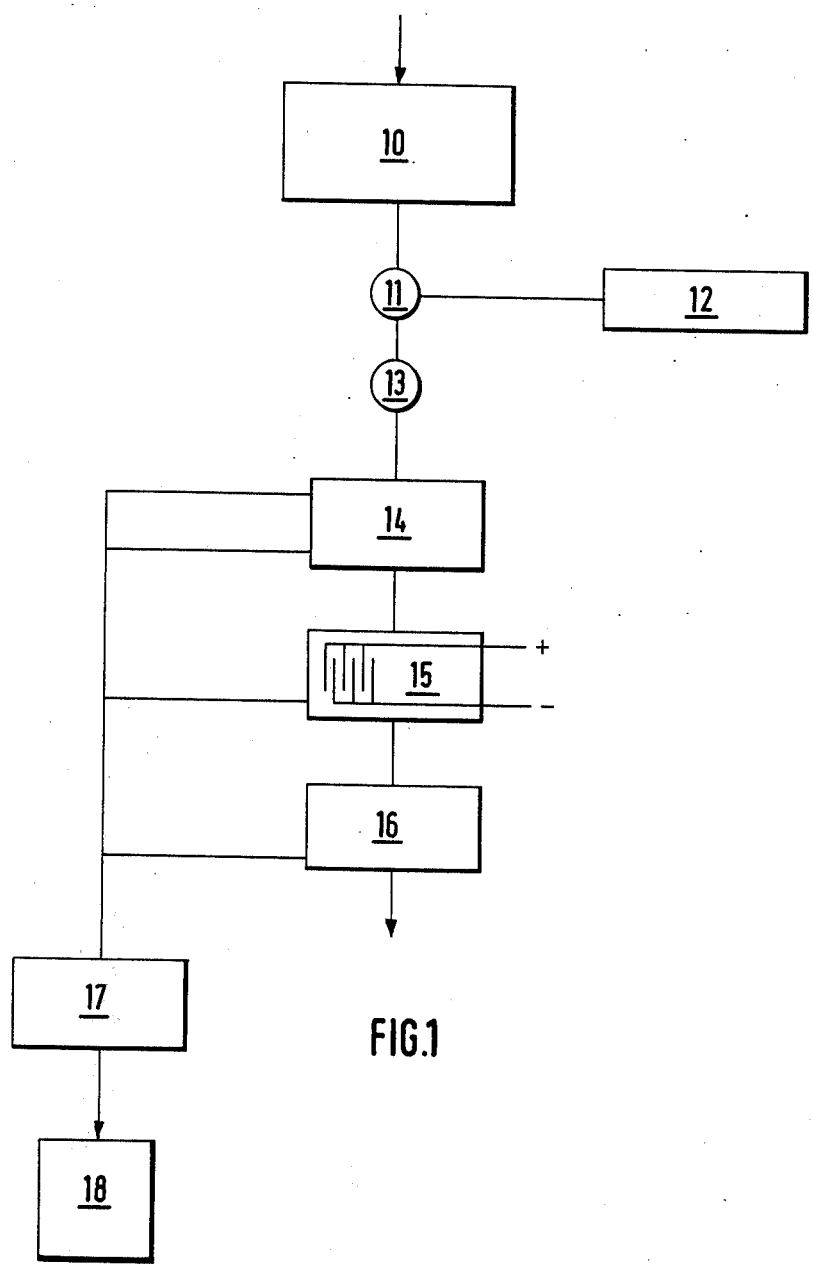
FIG. 1 shows the individual process stages of the invention in the form of a block diagram.

Hereinafter the invention is explained in exemplified manner relative to FIG. 1 which shows the individual process stages of the invention in the form of a block diagram. The sewage is firstly stored in a detritus chamber 10, from where it passes intermittently in batches of equal size into a preliminary sedimentation tank 14 via a metering pump 11, in which flocculating agents are added from a storage vessel 12 and via a comminuting pump 13. The substances which are able to settle contained in the homogenised sewage mixed with the flocculating agents are deposited in tank 14, whilst the fats and greases float to the surface. The thus pre-purified sewage then undergoes electrolysis in the electroreactor vessel 15. The oxygen liberated by the electrolysis causes an immediate and direct oxidation of the organic substances contained in the sewage, whilst the liberated hydrogen directly and immediately forms acids which kill off all types of germs. Solid constituents still present in the electrochemically treated sewage can then be deposited in the final sedimentation tank 16. The sludge formed from the deposited and suspended substances removed from the preliminary sedimentation tank, the electroreactor vessel and the final sedimentation tank are collected in a sludge container 17. The sludge is finally removed by it being fed, for example, to an incinerator 18 or through being discharged at a point where it can cause no harm. The clarified sewage is then discharged outside the ship from the final sedimentation tank 16.

The possibilities of using and performing the process of the invention are not limited to the details described and represented here. Thus, it can be advantageous for the purpose of preventing scum to additionally blow in compressed air at the lower end of a conically shaped sludge container. Such a sludge container can be structurally combined with the electroreactor vessel by being mounted at the lower end of the latter without any partition.

An apparatus for performing the novel process can be constructed in the particularly compact and space-saving manner necessary for ships by the detritus chamber, the metering and comminuting pump, chemical tank, preliminary sedimentation tank, electroreactor vessel, final sedimentation tank and sludge container being assembled to form a parallelepiped shaped unit in a common supporting frame.

As a dimensioning guide it can be assumed that in the case of a volume of approximately 1 $m^3$ for the electroreactor vessel and the remaining containers which in each case take up a corresponding portion of the sewage during one stage of the process, and an electroreactor vessel power input of 3 kW, the electrolysis process lasts about an hour. By increasing the capacity, based on the volume, a shorter treatment period is required, whereas a reduction in the capacity makes a longer treatment period necessary. All the process stages, including sludge removal, can be controlled completely automatically. The electrolysis process power supply can be direct current with a low voltage, e.g. 20 to 30 V taken from the alternating current power supply of the ship via a rectifier.

A further application of the process according to the invention for the treatment of sewage on ships relates more specifically to the final cleaning of water to be discharged outside the ship and which is mixed with oil residues, optionally in eumulsified form.

In many cases the purity level achieved with conventional separators when clarifying such sewage does not meet official requirements. Thus only an impurities content of lss than 15 ppm. is permitted for clarified sewage which was contaminated with oil in order to prevent harm to the environment or traces which are visible over a large water surface. This problem is of considerable significance, particularly for ships on which contaminated bilge water is obtained or which carries tanks which alternately transport liquid fuel and sea water, as well as for landing and take-off runways for aircraft which frequently become contaminated with fuel which is then washed away by rain and the contaminated water collects in the ditches alongside the runways.

The problem of the invention is to provide a process and an apparatus for making it possible to reduce to below 15 ppm the impurities content of the water cleaned or finally cleaned by means of the same.

According to the invention, this problem is solved in that the water containing the impurities undergoes electrolysis so that gas bubbles are formed which are chemically and/or mechanically combined with the impurities and form a scum which floats upwards due to buoyancy.

The novel process permits the clarification of polluted water to a surprisingly high purity level, accompanied by limited expenditure on time, power and equipment.

The process can be performed both continuously and also in desired manner intermittently.

For example, in the case of a reactor vessel volume of 1 $m^3$ and when operating with direct current at 6 to 24 V and a power intake of 150 A, a treatment period of 20 to 60 minutes is necessary. The higher the power level the shorter the treatment period.

According to the invention, the novel process is performed by an apparatus wherein are provided a container with one or more groups of electrode pairs enclosed therein, and an inflow opening arranged approximately level therewith for the water containing the impurities and which is to be treated, a scum discharge opening arranged at the upper end thereof and a discharge opening for the clarified water arranged at the lower end thereof, and with which is connected a clean water drain pipe leading to a level above the scum discharge opening. It is particularly advantageous to construct the apparatus in such a way that the upper part of the container conically tapers and passes into the scum discharge opening constructed as an overflow.

Hereinafter, the invention is explained in exemplified manner relative to FIG. 2.

The drawing shows an apparatus for separating impurities from polluted water in accordance with the process of the invention, whereby approximately half way up a container 21 are embedded two groups of electrode pairs 22,23. An inflow opening 24 for the water containing the impurities to be treated is provided at approximately the centre height of the two groups of electrode pairs. In the vicinity of its upper end, container 21 is conically tapered and passes approximately continuously into the scum discharge opening 25 constructed as an overflow discharge bend. At the lower end of container 21 is provided a discharge opening 26 for the clarified water with which is connected a clean water discharge pipe 27 leading to above the scum discharge opening 25, whereby the horizontal bent end of pipe 27 is designated by 28. It is thus ensured that the hydrostatic pressure of the water in the clean water discharge pipe 27 forces the scum in the container out through the scum discharge opening 25.

A pump is arranged in the not shown supply pipe for the water containing the impurities and leading to the inflow opening 24, by means of which the water can be supplied either continously or intermittently into container 21, accompanied by the simultaneous discharge of the clean water through pipes 26, 27 and 28 and the discharge of the scum from the overflow discharge bend 25.

The groups of electrode pairs 22,23 in each case comprise two perpendicular walls with electrode plates of alternating changing polarity located between the same and perpendicular thereto. The groups of electrode pairs 22,23 are constructed as insert units resting on guides 29 in the container. They are accessible from the outside by means of a not shown tightly sealable lateral opening of the container for the purpose of checking or replacing the electrodes. The electrodes can be made from aluminum or an aluminium alloy.

When a voltage is applied to the groups of electrode pairs 22,23 decomposition of the water between the electrodes takes place in known manner. The gas bubbles rise upwards and in part combine again to form water. On the outsides of the groups of electrode pairs the water again drops downwards, leading to a roller-type rotatory movement of the water within the container. The gas bubbles formed during the decomposition of the water immediately combine chemically and/or mechanically with the impurity no matter whether the latter is in the form of an emulsion or in the form of suspended or larger particles dispersed in the water. Part of the gas bubbles form a scum with the impurities which rise upwards in container 1. The clarified water is collected in the lower part of the container. A thorough electrolytic treatment of all parts of the container content is brought about through the simultaneously formed slow roller-like rotatory movement of the liquid.

A labyrinth-like arrangement of baffle plates 30, 31 is provided in container 21 below the groups of electrode pairs 22,23 and these plates prevent the entry of electrolytically untreated water or impurities into the clean water discharge pipe.

The apparatus can be constructed as a compact space-saving unit which is particularly suitable for installation in ships.

I claim:

1. An apparatus for the purification of sewage on ships by electrolysis comprising:
   (a) an enclosed chamber having a sewage inlet in its side wall at about the midpoint of the chamber, a clarified water exit at the bottom of the chamber, and a scum overflow discharge at the top;
   (b) a plurality of electrodes within the chamber positioned between said exit and discharge, adpated to electrolytically treat the incoming sewage; and
   (c) baffle means positioned between the bottom of the electrodes and the clarified water exist to prevent the entry of electrolytically untreated water into the clarified water exit.

2. The apparatus of claim 1 wherein the upper portion of the chamber is conically tapered and ends in said scum exit.

3. The apparatus of claim 1 wherein the clarified water exit communicates with a discharge pipe, the end of which is above the scum discharge such that the hydrostatic pressure of the water in said discharge pipe forces the scum out through the scum discharge.

4. The apparatus of claim 1 wherein the electrodes are formed from a series of spaced parallel plates positioned centrally in the chamber such that sewage entering the chamber through the sewage inlet flows between the electrodes.

5. The apparatus of claim 1 wherein there are two series of said plates, one above and one below the sewage inlet such that when a voltage is applied to the electrodes, decomposition of water between the electrodes creates air bubbles, the movement of which forms scum with impurities in the sewage which scum rises in the chamber and forces clarified water downward through the chamber.

* * * * *